(12) United States Patent  (10) Patent No.: US 6,801,705 B2
Sasaki et al.  (45) Date of Patent: Oct. 5, 2004

(54) OPTICAL FIBER CUTTING APPARATUS AND OPTICAL FIBER CUTTING METHOD THEREFOR

(75) Inventors: Katsumi Sasaki, Sakura (JP); Takeshi Sato, Sakura (JP); Kenji Takahashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 164 days.

(21) Appl. No.: 10/278,208

(22) Filed: Oct. 22, 2002

(65) Prior Publication Data

US 2003/0077062 A1 Apr. 24, 2003

(30) Foreign Application Priority Data

Oct. 23, 2001 (JP) ........................................ 2001-325415
Sep. 18, 2002 (JP) ........................................ 2002-271632

(51) Int. Cl.[7] ............................................... G02B 6/00
(52) U.S. Cl. ........................... 385/138; 385/147; 225/93
(58) Field of Search ................................ 385/134, 136, 385/138, 147; 225/93, 101, 103, 105

(56) References Cited

U.S. PATENT DOCUMENTS 5,106,006 A * 4/1992 Suda et al. ..................... 225/2

6,577,804 B2 * 6/2003 Murakami et al. ........... 385/147
6,634,079 B1 * 10/2003 Kazama ...................... 29/564.4
6,668,128 B2 * 12/2003 Hattori et al. .............. 385/136

FOREIGN PATENT DOCUMENTS

| JP | 60-184207 | 9/1985 |
|----|-----------|--------|
| JP | 61-232404 | 10/1986 |
| JP | 7-80798 | 3/1995 |

* cited by examiner

*Primary Examiner*—Ellen E. Kim
(74) *Attorney, Agent, or Firm*—Hoffmann & Baron, LLP

(57) ABSTRACT

An optical fiber cutting apparatus comprises a coated section holder, an uncoated section holder, and a cutter. A ferromagnetic substance or a magnet is disposed on a surface of the uncoated section holder and a surface of the cutter holder which are facing each other. A ferromagnetic substance or a plurality of magnet having different magnetic force are disposed with equal interval on the uncoated section holder or the cutter holder. Tension is applied to the optical fiber by repulsing-force which exists among a magnet, a first magnet, and the second magnet. Tension which is applied to the optical fiber increases gradually. By doing this, an optical fiber cutting apparatus is provided which does not decrease strength of the optical fiber.

18 Claims, 12 Drawing Sheets

OPTICAL FIBER CUTTING APPARATUS AND OPTICAL FIBER CUTTING METHOD THEREFOR

The application claims priority from Application No. JP 2001-325415, filed Oct. 23, 2001 and Application No. JP 2002-271632 filed on September 18, 2002.

BACKGROUND OF THE INVENTION

1. Field of the Invention

The present invention relates to an optical fiber cutting apparatus for cutting a tip of an optical fiber which is to be connected by using a fusion splicing method in which optical fibers are butt-connected. Also, the present invention relates to an optical fiber cutting method therefor.

2. Description of Related Art

Conventionally, it is common for fusion splicing of optical fibers to be performed by a butt-connecting method in which an end of the optical terminal is cut so as to form a lead wire of the optical fiber and tips of the optical fiber are butt-connected. In a fusion splicing operation of the optical fiber, in order to avoid connection loss, it is necessary to cut the optical fiber so that a cutting surface is orthogonal to an optical axis and cutting surfaces are finished as fine as a mirror. For such a cutting apparatus, an optical fiber cutting apparatus has already been realized.

FIG. 14 is a front view of a first example of conventional optical fiber cutting apparatus (See Japanese Unexamined Patent Application, First Publication No. Sho 60-184207, hereinafter called patent document 1).

In order to cut an optical fiber 1 by using the optical fiber cutting apparatus in the example, an uncoated section 1a, from which the coating layer was removed from its tip, is fixed by clamps 2 and 3. Next, a cutter 4 contacts the optical fiber 1 from beneath the optical fiber 1 in an orthogonal manner to an optical axis of the optical fiber 1. Thus, a crack is formed on a surface of the uncoated section 1a. Consequently, the uncoated section 1a is pushed by a cushion 5 from above the uncoated section 1a in an orthogonal manner to the optical axis of the optical fiber 1 so as to be bent toward an opposite surface which the crack occurs; and thus, the crack grows and the optical fiber is cut.

FIG. 15 is a front view of a second example of a conventional optical fiber cutting apparatus (See Japanese Unexamined Patent Application, First Publication No. Sho 61-232404, hereinafter called patent document 2).

In order to cut an optical fiber 1 by using the optical fiber cutting apparatus in the example, an uncoated section 1a, from which the coating layer was removed from its tip, is fixed by clamps 2 and 3 while applying a constant tension such as 200 gf. Next, a cutter 4 contacts the optical fiber 1 from a front end of the optical fiber 1 in an orthogonal manner to an optical axis of the optical fiber 1. Thus, a crack is formed on a surface of the uncoated section 1a. Accordingly, the crack is enlarged by the tension which is applied on the uncoated section 1a; thus, the uncoated section 1a is cut.

FIG. 16 is a front view of a third example of a conventional optical fiber cutting apparatus (See Japanese Unexamined Patent Application, First Publication No. Hei 7-80798, hereinafter called patent document 3).

In order to cut an optical fiber 1 by using the optical fiber cutting apparatus in the example, a coated section in the tip of the optical fiber 1 is removed so as to expose the uncoated section 1a. Next, a slider 6 is manipulated such that a cutter 7 is disposed in front of the uncoated section 1a. Consequently, an uncoated section clamp 8 and a coated section clamp 9 are released, and the uncoated section 1a is fit to a fixed groove (not shown in the drawing). Also, the coated section of the optical fiber 1 is fitted to a guide groove (not shown in the drawing). Next, the coated section clamp 9 is closed, and a coated section clamp base 10 is pushed in an approaching direction to the cutter 7 until it reaches a predetermined position. In this condition, the uncoated section clamp 8 is closed. At this time, the coated section clamp base 10 tends to move away from the cutter 7 by a built-in spring 11. Therefore, constant tension is applied to the optical fiber 1. Next, the cutter 7 contacts the optical fiber 1 from a front end of the optical fiber 1 in an orthogonal manner to an optical axis of the optical fiber 1 so as to form a crack on a surface of the uncoated section 1a. At this time, the cutter 7 contacts the uncoated section 1a. Also while sliding in a horizontal direction, a tip of a plunger 12 disposed on the cutter 7 contacts a slanted surface 13. By doing this, the tension of optical fiber 1 increases gradually, and a crack which is formed on the uncoated section 1a is enlarged; thus, the uncoated section 1a is cut.

In the first example of a conventional optical fiber cutting apparatus, a clamp 3 clamps a portion of the uncoated section 1a which is not cut. Therefore, there was a case in which a small flaw was produced on the uncoated section 1a. As a result, there was a problem that strength of the optical fiber 1 decreased.

Also, in the second example of a conventional optical fiber cutting apparatus, there was a problem in that flatness and surface smoothness of the cutting surface were insufficient.

Also, in the third example of conventional optical fiber cutting apparatus, when a crack formed on the uncoated section 1a, the plunger 12 contacts the slant surface 13, and a vibration due to the contact is transferred to the cutter 7. Because of this, there were problems in that the crack was not formed on the uncoated section 1a stably and thus, acceptable cutting surface could not be obtained. Also, when the uncoated section clamp 8 and the coated section clamp 9 were closed so as to fix the optical fiber 1, an operator had to perform the clamping operation with both hands; therefore, there was a problem in that operating efficiency was insufficient. Furthermore, if the operator forgot to push the coated section clamp base 10 in an approaching direction to the cutter 7, it was not possible to obtain tension on the optical fiber for forming the crack on the uncoated section 1a. Therefore, there was a problem in that the uncoated section 1a could not be cut.

SUMMARY OF THE INVENTION

The present invention was made in consideration of the above-explained problems. An object of the present invention is to provide an optical fiber cutting apparatus which can cut an optical fiber easily and optical fiber cutting method without decreasing the strength of the optical fiber. The above-explained problems can be solved by an optical fiber cutting apparatus comprising:

a coated section holder for holding a coated section of an optical fiber terminal;

an uncoated section holder for holding an uncoated section of an optical fiber; and a cutter for cutting the uncoated section between the coated section holder and the uncoated section holder, wherein a ferromagnetic substance or a magnet is disposed on facing surfaces of the uncoated section holder and a cutter holder for holding the cutter.

It is preferable that a ferromagnetic substance or a plurality of magnets having different magnetic force be disposed on the uncoated section holder or the cutter holder with a certain interval.

The above-explained problems can be solved by an optical fiber cutting apparatus comprising:
- a coated section holder for holding a coated section of an optical fiber terminal;
- an uncoated section holder for holding an uncoated section of an optical fiber; and
- a cutter for cutting the uncoated section between the coated section holder and the uncoated section holder, wherein
- a ferromagnetic substance or a magnet is disposed on facing surfaces of the coated section holder and a cutter holder for holding the cutter.

It is preferable that a ferromagnetic substance or a plurality of magnets having different magnetic force be disposed on the coated section holder or the cutter holder with a certain interval.

The above-explained problems can be solved by an optical fiber cutting apparatus comprising:
- a coated section holder for holding a coated section of an optical fiber terminal;
- an uncoated section holder having a first uncoated section holder which is disposed next to the coated section holder and a second uncoated section holder which is disposed away from the first uncoated section holder; and
- a cutter for cutting the uncoated section between the first uncoated section holder and the second uncoated section holder, wherein
- a ferromagnetic substance or a magnet is disposed on facing surfaces of the uncoated section holder and a cutter holder for holding the cutter.

It is preferable that a ferromagnetic substance or a plurality of magnet having different magnetic force be disposed on the uncoated section holder or the cutter holder with a certain interval.

The above-explained problems can be solved by an optical fiber cutting apparatus comprising:
- a coated section holder for holding a coated section of an optical fiber terminal;
- an uncoated section holder having a first uncoated section holder which is disposed next to the coated section holder and a second uncoated section holder which is disposed away from the first uncoated section holder; and
- a cutter for cutting the uncoated section between the first uncoated section holder and the second uncoated section holder, wherein
- a ferromagnetic substance or a magnet is disposed on facing surfaces of the coated section holder and a cutter holder for holding the cutter.

It is preferable that a ferromagnetic substance or a plurality of magnet having different magnetic force be disposed on the coated section holder or the cutter holder with a certain interval.

Also, the above-explained problems can be solved by an optical fiber cutting apparatus comprising:
- a coated section holder for holding a coated section of an optical fiber terminal;
- an uncoated section holder for holding an uncoated section of an optical fiber; and
- a cutter for cutting the uncoated section between the coated section holder and the uncoated section holder, wherein
- the uncoated section holder is rotatably fixed on a base for fixing the coated section holder;
- two ferromagnetic substances having different polarities or two magnets having different polarities are disposed in a predetermined interval on the cutter holder for fixing the cutter which faces the uncoated section holder; and
- a ferromagnetic substance or a magnet is disposed on a surface of the uncoated section holder which faces the cutter holder.

The above-explained problems can be solved by an optical fiber cutting method for cutting an optical fiber using an optical fiber cutting apparatus wherein the optical fiber is cut by forming a crack in the uncoated section of the optical fiber by the cutter and by applying tension to the optical fiber by repulsing force between a magnet which is disposed on the coated section holder and a magnet which is disposed on the cutter holder.

Here, it is preferable that tension which is caused by repulsing force between a magnet which is disposed on the coated section holder and a magnet which is disposed on the cutter holder be applied to an optical fiber while the tension gradually increases.

The above-explained problems can be solved by an optical fiber cutting method for cutting an optical fiber using an optical fiber cutting apparatus wherein the optical fiber is cut by forming a crack in the uncoated section of the optical fiber by the cutter and by applying tension to the optical fiber by repulsing force between a magnet which is disposed on the uncoated section holder and a magnet which is disposed on the cutter holder.

Here, it is preferable that tension which is caused by repulsing force between a magnet which is disposed on the uncoated section holder and a magnet which is disposed on the cutter holder be applied to an optical fiber while the tension gradually increases.

The above-explained problem can be solved by optical fiber cutting method for cutting an optical fiber using an optical fiber cutting apparatus wherein the optical fiber is cut by forming a crack in the uncoated section of the optical fiber by the cutter and by applying tension to the optical fiber by pulling-force between a magnet which is disposed on the coated section holder and a magnet which is disposed on the cutter holder.

Here, it is preferable that tension which is caused by pulling-force between a magnet which is disposed on the coated section holder and a magnet which is disposed on the cutter holder be applied to an optical fiber while the tension gradually increases.

The above-explained problems can be solved by an optical fiber cutting method for cutting an optical fiber using an optical fiber cutting apparatus wherein the optical fiber is cut by forming a crack in the uncoated section of the optical fiber by the cutter and by applying tension to the optical fiber by pulling-force between a magnet which is disposed on the uncoated section holder and a magnet which is disposed on the cutter holder.

Here, it is preferable that tension which is caused by pulling-force between a magnet which is disposed on the uncoated section holder and a magnet which is disposed on the cutter holder be applied to an optical fiber while the tension gradually increases.

The above-explained problems can be solved by an optical fiber cutting method for cutting an optical fiber by an optical fiber cutting apparatus wherein the optical fiber is cut by forming a crack in an uncoated section of the optical fiber by moving the cutter and by applying tension which is caused by self-weight of the uncoated section holder at a position between the uncoated section holder and the cutter holder on the optical fiber.

As explained above, by the optical fiber cutting apparatus according to the present invention, it is possible to apply tension in an optical axis direction of the optical fiber. Therefore, it is possible to cut the optical fiber without applying bending-force to a crack which is formed on a surface of the optical fiber. Thus, a flaw does not occur on a surface of the optical fiber. Also, a mirror-finished surface can be relatively obtained stably.

Also, by the optical fiber cutting method according to the present invention, vibrations are not transmitted to the cutter when tension is applied to the optical fiber. Therefore, a crack can be formed on a surface of the optical fiber stably; and thus, surface finish of the optical fiber is desirable.

BRIEF DESCRIPTION OF THE DRAWINGS

FIG. 1A is a plan view, and FIG. 1B is a front view.

FIG. 7A is a plan view, and FIG. 7B is a front view.

FIG. 8A is a plan view, and FIG. 8B is a front view.

FIG. 9A is a plan view, and FIG. 9B is a front view.

FIG. 10A is a plan view, and FIG. 10B is a front view.

FIG. 11A is a plan view, and FIG. 11B is a front view.

FIG. 12A is a plan view, and FIG. 12B is a front view.

DETAILED DESCRIPTION OF THE INVENTION

Here, the present invention is explained in detail as follows.

Figure 1A:
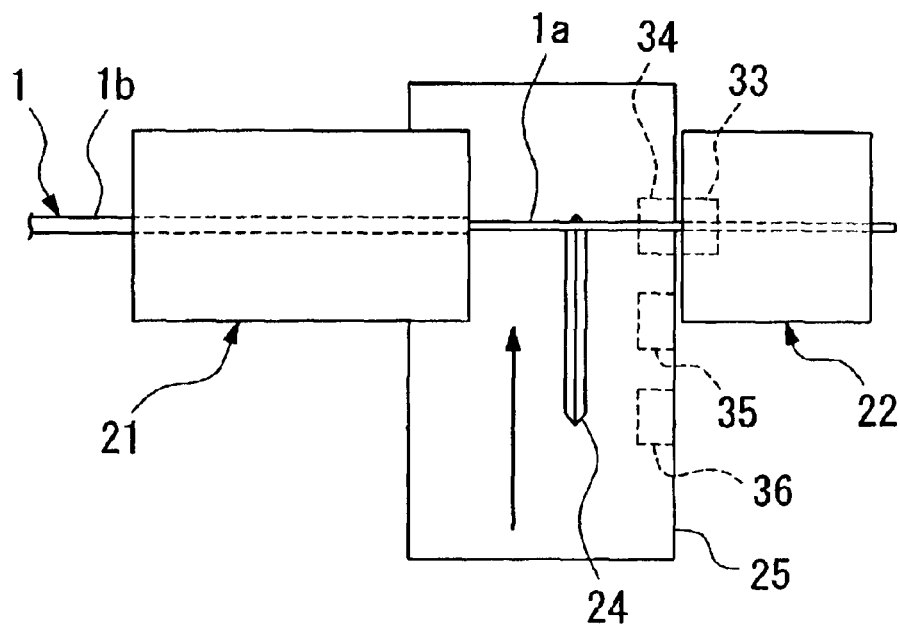
FIGS. 1A and 1B show a first embodiment of the optical fiber cutting apparatus according to the present invention.
Figure 1B:
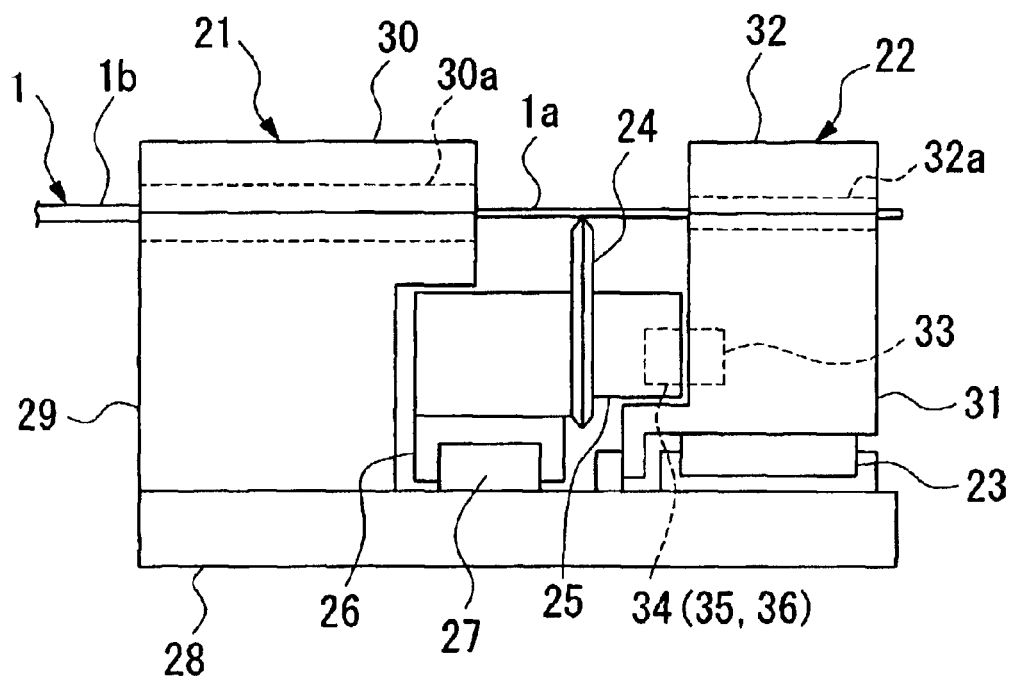

FIGS. 1A and 1B are general views of a first embodiment of an optical fiber cutting apparatus. FIG. 1A is a plan view, and FIG. 1B is a front view.

An optical fiber cutting apparatus according to the present invention comprises:

a coated section holder 21 for fixing a coated section 1*b* of the optical fiber 1;

an uncoated section holder 22 for fixing the uncoated section 1*a*;

an uncoated section slider 23 which can move on the uncoated section 1*a* in an optical axis direction of the optical fiber 1;

a circular cutter 24 for cutting the uncoated section 1*a*;

a cutter holder 25 for fixing the cutter 24;

a cutter slider 26 which can move the cutter holder 25 in a direction orthogonal to the optical fiber 1;

a guide rail 27 which holds the cutter slider 26 so as to be slidable in a direction orthogonal to the optical fiber 1; and a base 28 which holds the above-mentioned structures thereon.

Also, the coated section holder 21 and the uncoated section holder 22 are disposed on the base 28 so as to face each other such that the cutter 24 is disposed between the coated section holder 21 and the uncoated section holder 22. Longitudinal direction of the coated section holder 21 and longitudinal direction of the uncoated section holder 22 are in parallel with the longitudinal direction of the optical fiber cutting apparatus. The coated section holder 21 contains a coated section clamp base 29 and a coated section clamp 30 which is connected with the coated section clamp base 29 by a hinge so as to freely open and close.

Also, on the coated section clamp base 29, a groove (not shown in the drawing) is formed in parallel with the longitudinal direction of the optical fiber cutting apparatus so as to fix the coated section 1*b* of the optical fiber 1. Also, on the coated section clamp 30, a contact member 30*a* made from a flexible substance such as a rubber for pushing the coated section 1*b* of the optical fiber 1 so as to fix the coated section 1*b* of the optical fiber 1 in a groove which is formed on the coated section clamp base 29 is disposed in parallel with the longitudinal direction of the optical fiber cutting apparatus. The uncoated section holder 22 contains an uncoated section clamp base 31 and an uncoated section clamp 32 which is connected with the uncoated section clamp base 31 by a hinge so as to freely open and close.

Also, on the uncoated section clamp base 31, a flexible substance such as a rubber (not shown in the drawing) is formed in parallel with the longitudinal direction of the optical fiber cutting apparatus so as to fix the uncoated section 1*a* of the optical fiber 1. Also, on the uncoated section clamp 32, a contact member 32*a* made from a flexible substance such as a rubber for pushing the uncoated section 1*a* of the optical fiber 1 so as to fix the uncoated section 1*a* of the optical fiber 1 in a groove which is formed on the uncoated section clamp base 31 is disposed in parallel with the longitudinal direction of the optical fiber cutting apparatus. If the optical fiber 1 is contained in the groove which is formed on the coated section clamp base 29, it is possible to fix the optical fiber 1 orthogonally on the cutter 24. Here, a position of the optical fiber 1 orthogonal to the cutter 24 indicates a parallel disposition of the optical fiber with a direction in a shorter dimension side of the optical fiber cutting apparatus.

Also, a magnet 33 is disposed almost in a center of a surface of the uncoated section clamp base 31 facing the cutter holder 25.

Also, a ferromagnetic substance 34 made from a metal such an iron, a first magnet 35, and a second magnet 36 are disposed on a surface of the cutter holder 25 facing the uncoated section clamp base 31 at an equal interval. Also, if magnetic force of the first magnet 35 and magnetic force of the second magnet 36 are compared, magnetic force of the second magnet 36 is stronger than that of the first magnet 35.

Figure 2:
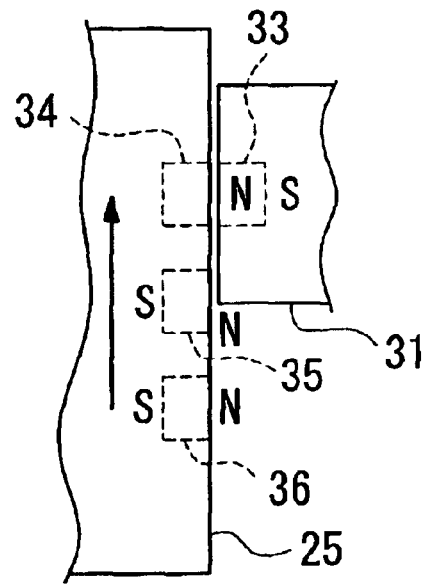
FIG. 2 shows a first example of a relationship between a magnet which is disposed on an uncoated section clamp base and a magnet which is disposed on a cutter holder.

Also, the magnet 33 is disposed so as to have the same polarity as the first magnet 35 and the second magnet 36. The magnet 33 is disposed so as face the first magnet 35 and the second magnet 36. FIG. 2 shows a first example of a relationship between a magnet which is disposed on the uncoated section clamp base 31 and a magnet which is disposed on the cutter holder 25.

The N-pole of the magnet 33 is disposed so as to face the cutter holder 25. The N-pole of the first magnet 35 and the N-pole of the second magnet 36 are disposed so as to face the uncoated section clamp base 31.

Figure 3:
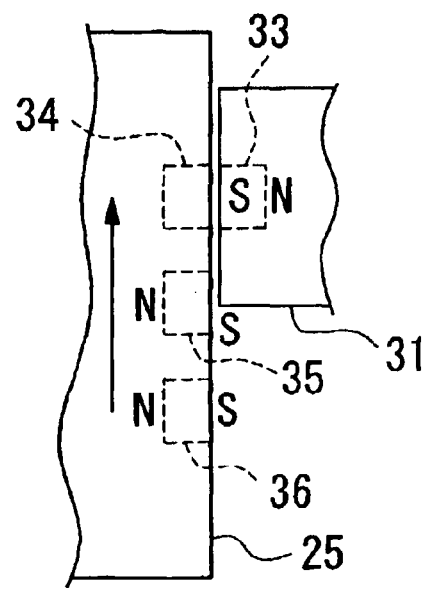
FIG. 3 shows a second example of a relationship between a magnet which is disposed on an uncoated section clamp base and a magnet which is disposed on a cutter holder.

FIG. 3 shows a second example of a relationship between a magnet which is disposed on the uncoated section clamp base 31 and a magnet which is disposed on the cutter holder 25.

The S-pole of the magnet 33 is disposed so as to face the cutter holder 25. The S-pole of the first magnet 35 and the S-pole of the second magnet 36 are disposed so as to face the uncoated section clamp base 31.

Figure 4:
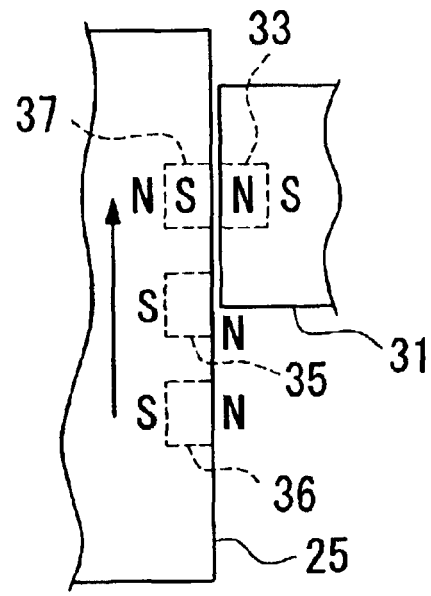
FIG. 4 shows a third example of a relationship between a magnet which is disposed on an uncoated section clamp base and a magnet which is disposed on a cutter holder.

FIG. 4 shows a third example of a relationship between a magnet which is disposed on the uncoated section clamp base 31 and a magnet which is disposed on the cutter holder 25.

The N-pole of the magnet 33 is disposed so as to face the cutter holder 25. The N-pole of the first magnet 35 and the N-pole of the second magnet 36 are disposed so as to face the uncoated section clamp base 31. Also, in this example, a third magnet 37 is used instead of the ferromagnetic substance 34. The S-pole of the third magnet 37 is disposed so as to face the uncoated section clamp base 31.

Figure 5:
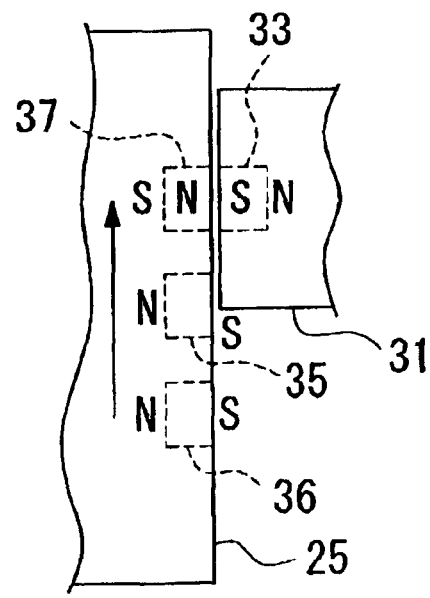
FIG. 5 shows a fourth example of a relationship between a magnet which is disposed on an uncoated section clamp base and a magnet which is disposed on a cutter holder.

FIG. 5 shows a fourth example of a relationship between a magnet which is disposed on the uncoated section clamp base 31 and a magnet which is disposed on the cutter holder 25.

The S-pole of the magnet 33 is disposed so as to face the cutter holder 25. The S-pole of the first magnet 35 and the S-pole of the second magnet 36 are disposed so as to face the uncoated section clamp base 31. Also, in this example, a third magnet 37 is used instead of the ferromagnetic substance 34. The N-pole of the third magnet 37 is disposed so as to face the uncoated section clamp base 31.

An embodiment of the optical fiber cutting apparatus is explained with reference to FIG. 1 as follows.

First, a coating layer of a tip of the optical fiber 1 is removed so as to expose an uncoated section 1a.

Next, a cutter holder 25 together with a cutter slider 26 is moved on a guide rail 27 in an opposite direction to an arrow shown in the drawing to a position where a magnet 33 and a ferromagnetic substance 34 face each other. At this time, the uncoated section holder 22 together with the uncoated section slider 23 is pulled to the cutter holder 25 in an optical axis direction of the optical fiber 1 by a magnetic force generated between the magnet 33 and the ferromagnetic substance 34.

Next, the coated section clamp 30 and the uncoated section clamp 32 are released under the above-explained conditions. Consequently, the coated section 1b is contained in a groove which is formed on the coated section clamp base 29, and the uncoated section 1a is disposed on a flexible substance made of a rubber or the like such as the uncoated section clamp base 31.

Next, the coated section clamp 30 is closed. The coated section 1b is pushed by a contacting member 30a of the coated section clamp 30 so as to fix the coated section 1b. Next, the uncoated section clamp 32 is closed. The uncoated section 1a is pushed by a contacting member 32a of the uncoated section clamp 32 so as to fix the uncoated section 1a. At this time, tension has not yet been applied to the optical fiber 1.

Next, the cutter holder 25 together with the cutter slider 26 is moved on the guide rail 27 in a direction of an arrow in the drawing (in a direction orthogonal to an optical axis of the optical fiber 1). Relatively weak force is applied on the uncoated section holder 22 in an optical axis direction of the optical fiber 1 (in a direction separating away from the cutter holder 25) by repulsing force generated between the magnet 33 and the first magnet 35. By doing this, relatively weak tension (nearly 80 gf) is applied to the optical fiber 1 in an optical axis direction. Also a crack is formed on a surface of the uncoated section 1a because the cutter 24 contacts the uncoated section 1a. At this time, tension which is applied to the uncoated section 1a is insufficient to enlarge the crack so as to cut the uncoated section 1a. Furthermore, when the cutter 24 is moved in an orthogonal direction to an optical axis of the optical fiber 1, relatively strong force is applied to the uncoated section holder 22 in a direction which separates away from the cutter holder 25 along an optical axis direction of the optical fiber 1 by repulsing force generated between the magnet 33 and the second magnet 36. By doing this, relatively strong force (nearly 200 gf) is applied to the optical fiber 1 in an optical axis direction. Consequently, a crack which is formed on a surface of the uncoated section 1a enlarges; thus, the uncoated section 1a is cut.

Figure 6:
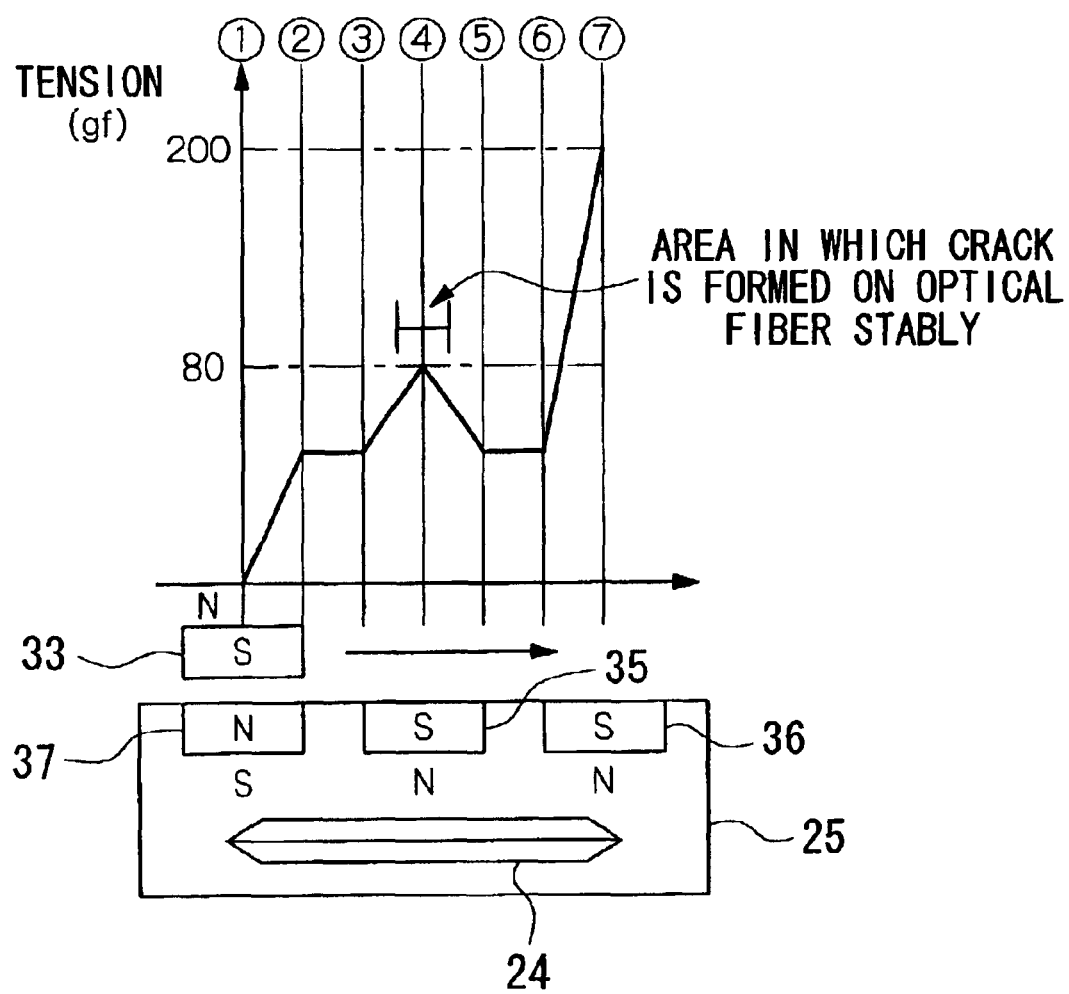
FIG. 6 shows how tension which is applied to the optical fiber changes when the cutter is moved in an orthogonal direction to an optical axis of the optical fiber.

FIG. 6 shows how tension which is applied to the optical fiber changes when the cutter is moved in an orthogonal direction to an optical axis of the optical fiber.

Here, with reference to FIG. 6, explanation is given for how tension which is applied to the optical fiber changes when the optical fiber is cut by using the optical fiber cutting apparatus according to the present embodiment as follows.

In ① in FIG. 6, the cutter holder 25 is in an initial position. Pulling-force exists between the N-pole of the third magnet 37 which is disposed on the cutter holder 25 and the S-pole of the magnet 33 which is disposed on the uncoated section holder 22. Moment, which is generated by pulling-force existing around a center of the uncoated section clamp 32 of the uncoated section holder 22, is larger than moment which is generated by self-weight of the uncoated section holder 22. Therefore, tension which is applied to the optical fiber 1 is 0 gf.

During ① to ②, pulling-force which exists between the third magnet 37 and the magnet 33 decreases; thus, tension which is applied to the optical fiber 1 becomes dominant by self-weight of the uncoated section holder 22.

During ② to ③, tension is applied to the optical fiber 1 only by self-weight of the uncoated section holder 22.

During ③ to ④, repulsing force which exists between the first magnet 35 and the magnet 33 begins increasing.

Tension is applied to the optical fiber 1 in accordance with the self-weight of the uncoated section holder 22. At ④, 80 gf of tension is applied to the optical fiber 1.

During ④ to ⑤, repulsing force which exists between the first magnet 35 and the magnet 33 begins decreasing. Tension which is applied to the optical fiber 1 becomes dominant by self-weight of the uncoated section holder 22.

During ⑤ to ⑥, tension is applied to the optical fiber 1 only by self-weight of the uncoated section holder 22.

During ⑥ to ⑦, repulsing force which exists between the second magnet 36 and the magnet 33 begins increasing. Tension containing self-weight of the uncoated section holder 22 is applied to the optical fiber 1.

At ⑦, 200 gf of tension is applied to the optical fiber 1; thus, the optical fiber 1 is cut.

Figure 7A:
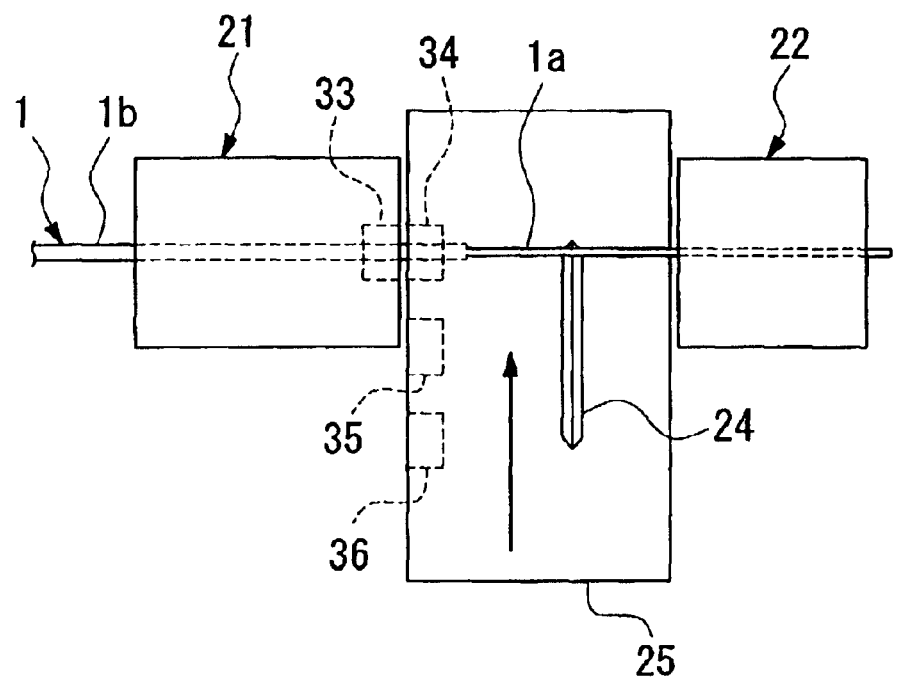
FIGS. 7A and 7B show a second embodiment of the optical fiber cutting apparatus according to the present invention.
Figure 7B:
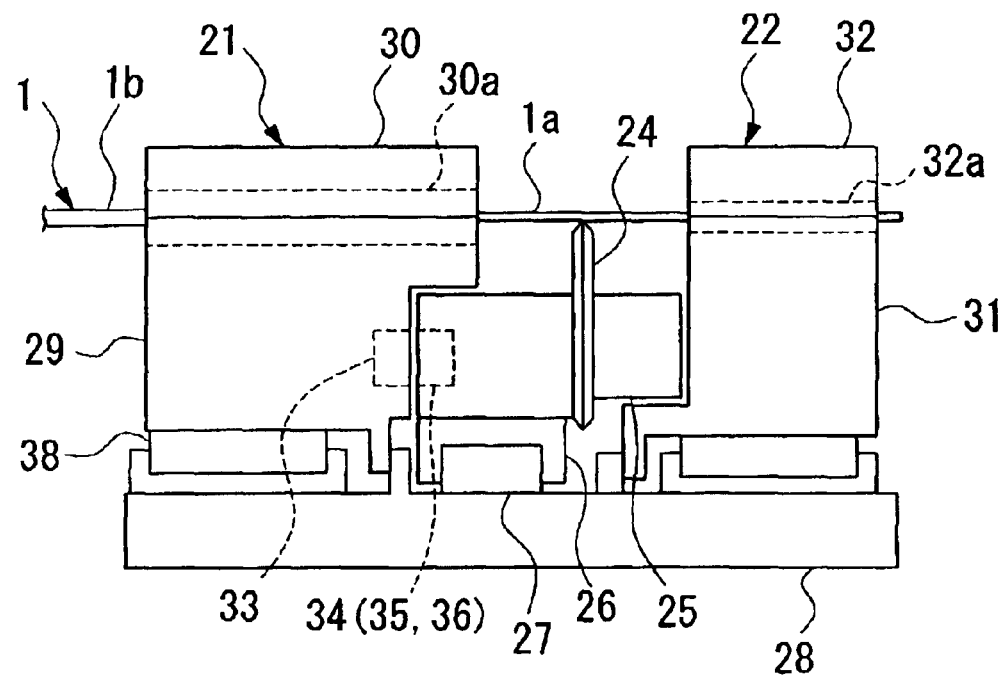

FIGS. 7A and 7B show a second embodiment of the optical fiber cutting apparatus according to the present invention. FIG. 7A is a plan view. FIG. 7B is a front view. In FIG. 7, the same reference numerals are applied to corresponding members as shown in the first embodiment shown in FIG. 1 so as to omit the repeated explanation thereof.

In the optical fiber cutting apparatus-according to the present embodiment, a coated section slider 38 which can move the coated section holder 21 in an optical axis direction of the optical fiber 1 is provided on the coated section holder 21.

Also, the magnet 33 is disposed in nearly a center of a surface of the coated section clamp base 29 facing the cutter holder 25.

Also, a ferromagnetic substance 34, the first magnet 35, and the second magnet 36 are disposed on a surface of the cutter holder 25 facing the coated section clamp base 29 in an equal interval.

Also, the magnet 33 is disposed so as to have the same polarity as the first magnet 35 and the second magnet 36. The magnet 33 is disposed so as face the first magnet 35 and the second magnet 36. An embodiment of the optical fiber cutting apparatus is explained with reference to FIGS. 7A and 7B as follows.

First, the cutter 24 is moved in an opposite direction to an arrow shown in the drawing. The magnet 33 and the ferromagnetic substance 34 are disposed so as to face each other. At this time, the coated section holder 21 together with the coated section slider 38 is pulled to the cutter holder 25 in an optical axis direction of the optical fiber 1.

Consequently, while maintaining the above-described condition, the coated section 1b is fixed to the coated section holder 21, and the uncoated section 1a is fixed to the uncoated section holder 22. Next, the cutter 24 is moved in a direction of an arrow (in an orthogonal direction to an optical axis of the optical fiber 1) shown in the drawing. Relatively weak force is applied to the coated section holder 21 in a direction which separates away from the cutter holder 25 in an optical axis of the optical fiber 1 by repulsing force which exists between the magnet 33 and the first magnet 35 at the same time as the cutter 24 contacts the uncoated section 1a from beneath. By doing this, relatively weak force is applied to the optical fiber 1 in an optical axis direction. Furthermore, relatively strong force is applied to the coated section holder 21 in a direction which separates away from the cutter holder in an optical axis direction of the optical fiber 1 by the repulsing force which exists between the magnet 33 and the second magnet 36 when the cutter 24 is moved in an orthogonal direction to an optical axis of the optical fiber 1. By doing this, relatively strong force is applied to the optical fiber 1 in an optical axis direction. Therefore, a crack which is formed on a surface of the uncoated section 1a is enlarged; thus, the uncoated section 1a is cut.

Figure 8A:
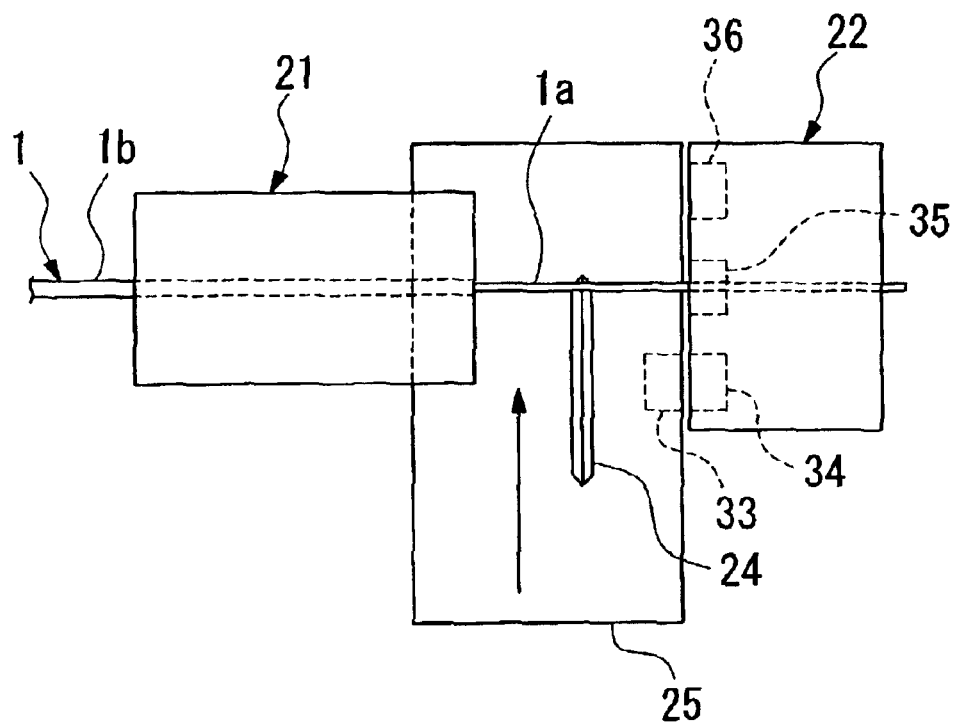
FIGS. 8A and 8B show a third embodiment of the optical fiber cutting apparatus according to the present invention.
Figure 8B:
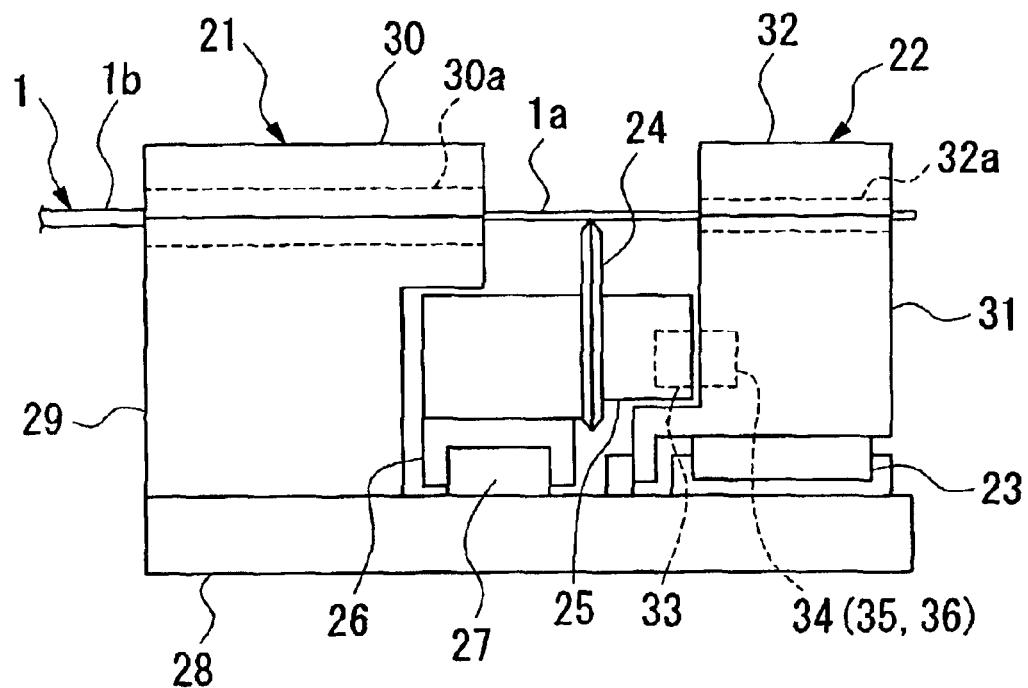

Also, consequently, when the optical fiber 1 is set in the optical fiber cutting apparatus so as to be cut, the uncoated section clamp 22 returns to the initial position automatically if the cutter 24 is returned to a position where the magnet 33 and the ferromagnetic substance 34 faces each other. FIGS. 8A and 8B show a third embodiment of the optical fiber cutting apparatus according to the present invention. FIG. 8A is a plan view. FIG. 8B is a front view. In FIG. 8, the same reference numerals are applied to corresponding members as shown in the first embodiment shown in FIG. 1 so as to omit the repeated explanation thereof.

In the optical fiber cutting apparatus according to the present embodiment, a ferromagnetic substance 34, the first magnet 35, and the second magnet 36 are disposed on a surface of the uncoated section clamp base 31 facing the cutter holder 25 in equal intervals.

Also, the magnet 33 is disposed in nearly a center of a surface of the cutter holder 25 facing the uncoated section clamp base 31.

Also, the magnet 33 is disposed so as to have the same polarity as the first magnet 35 and the second magnet 36. The magnet 33 is disposed so as face the first magnet 35 and the second magnet 36. An embodiment of the optical fiber cutting apparatus is explained with reference to FIGS. 8A and 8B as follows.

First, the cutter 24 is moved in an opposite direction to an arrow shown in the drawing. The magnet 33 and the ferromagnetic substance 34 are disposed so as to face each other. At this time, the uncoated section holder 22 is pulled to the cutter holder 25 in an optical axis direction of the optical fiber 1.

Consequently, while maintaining the above-described condition, the coated section 1b is fixed to the coated section holder 21, and the uncoated section 1a is fixed to the uncoated section holder 22. Next, the cutter 24 is moved in a direction of an arrow (in an orthogonal direction to an optical axis of the optical fiber 1) shown in the drawing. Relatively weak force is applied to the uncoated section holder 22 in a direction which separates away from the cutter holder 25 in an optical axis of the optical fiber 1 by repulsing force which exists between the magnet 33 and the first magnet 35 at the same time as the cutter 24 contacts the uncoated section 1a from beneath. By doing this, relatively weak tension is applied to the optical fiber 1 in an optical axis direction. Furthermore, relatively strong force is applied to the uncoated section holder 22 in a direction which separates away from the cutter holder 25 in an optical axis direction of the optical fiber 1 by the repulsing force which exists between the magnet 33 and the second magnet 36 when the cutter 24 is moved in an orthogonal direction to an optical axis of the optical fiber 1. By doing this, relatively strong tension is applied to the optical fiber 1 in an optical axis direction. Therefore, a crack which is formed on a surface of the uncoated section 1a is enlarged; thus, the uncoated section 1a is cut.

Figure 9A:
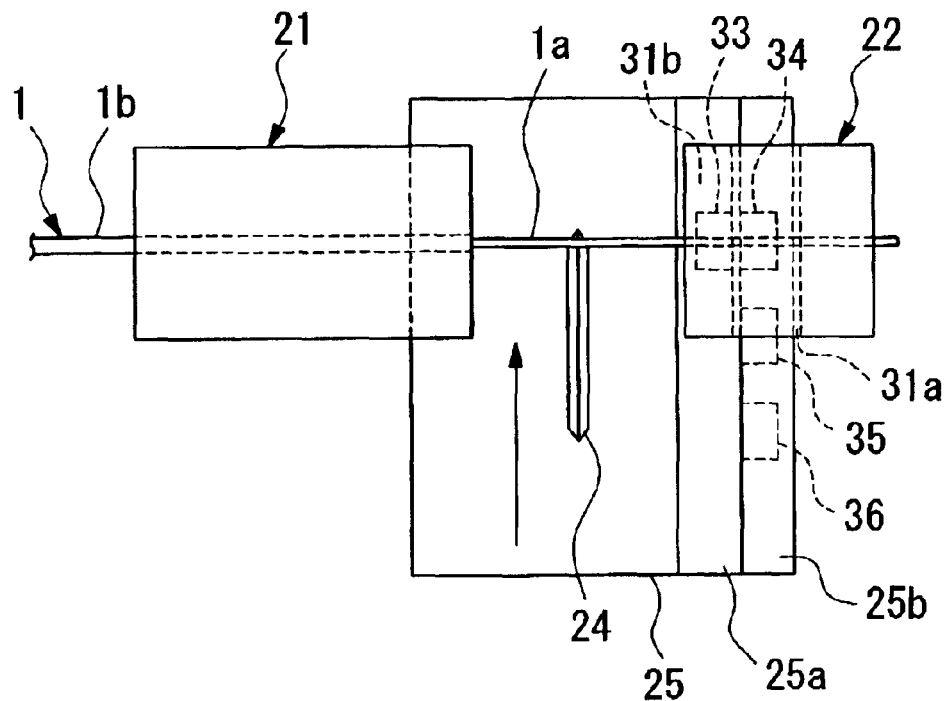
FIGS. 9A and 9B show a fourth embodiment of the optical fiber cutting apparatus according to the present invention.
Figure 9B:
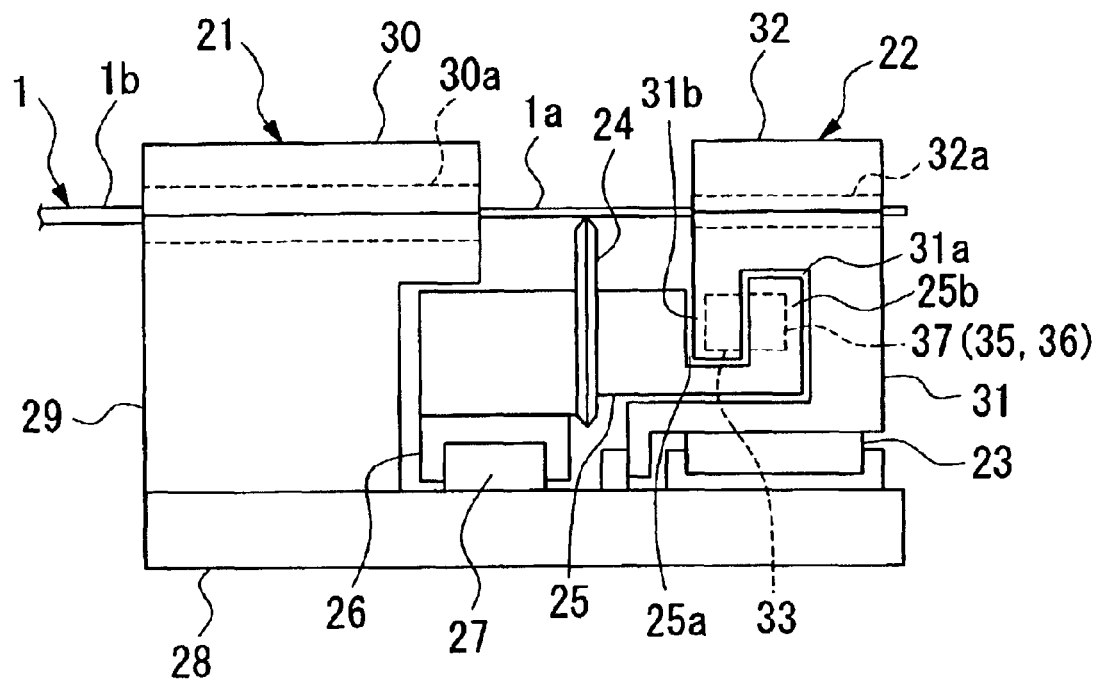

FIGS. 9A and 9B show a fourth embodiment of the optical fiber cutting apparatus according to the present invention. FIG. 9A is a plan view. FIG. 9B is a front view. In FIGS. 9A and 9B, the same reference numerals are applied to corresponding members as shown in the first embodiment shown in FIG. 1 so as to omit the repeated explanation thereof.

In the optical fiber cutting apparatus according to the present embodiment, a concave groove 25a is formed in an orthogonal direction (in an orthogonal direction to an optical axis direction of the optical fiber 1) to longitudinal direction of the cutter holder 25. Also, by forming the concave groove 25a, a convex rail 25b is formed on the cutter holder 25.

Also, on the uncoated section clamp base 31, a concave groove 31a and a convex rail 31b are formed in an orthogonal direction to a longitudinal direction of the optical fiber cutting apparatus so as to fit the convex rail 25b into the concave groove 25a of the cutter holder 25 having a space therebetween.

By the concave groove 25a, the convex rail 25b, the concave groove 31a, and the convex rail 31b, the cutter holder 25 is fitted into the uncoated section clamp base 31 having a space therebetween so as to be slidable in an orthogonal direction to an optical axis of the optical fiber 1.

Also, the magnet 33 is disposed in nearly a center of a surface of the convex rail 31b facing to the convex rail 25b.

Also, the magnet 33 is disposed in nearly a center of a surface of the cutter holder 25 facing the uncoated section clamp base 31.

Also, the magnet 33 is disposed so as to have the same polarity as the first magnet 35 and the second magnet 36. The magnet 33 is disposed so as face the first magnet 35 and the second magnet 36.

Also, the first magnet 35, the second magnet 36, and the third magnet 37 are disposed on a surface of the convex rail 25b facing the convex rail 31b with an equal interval.

Also, the magnet 33 is disposed so as to have the different polarity from that of the first magnet 35 and the second magnet 36. The magnet 33 is disposed so as have the same polarity as that of the third magnet 37. The magnet 33 is disposed so as to face the first magnet 35, the second magnet 36, and the third magnet 37. An embodiment of the optical fiber cutting apparatus is explained with reference to FIGS. 9A and 9B as follows.

First, the cutter 24 is moved in an opposite direction to an arrow shown in the drawing. The magnet 33 is disposed so as to face the third magnet 37. At this time, the uncoated section holder 22 is pulled to the cutter holder 25 in an optical axis direction of the optical fiber 1 by repulsing-force existing between the magnet 33 and the third magnet 37.

Consequently, while maintaining the above-described condition, the coated section 1b is fixed to the coated section holder 21, and the uncoated section 1a is fixed to the uncoated section holder 22. Next, the cutter 24 is moved in a direction of an arrow (in an orthogonal direction to an optical axis of the optical fiber 1) shown in the drawing. The convex rail 31b which is disposed on the uncoated section clamp base is pulled to the convex rail 25b which is disposed on the cutter holder 25 by repulsing-force existing between the magnet 33 and the first magnet 35 at the same time as the cutter 24 contacts the uncoated section 1a from beneath. As a result, relatively weak force is applied to the uncoated section holder 22 in a direction which separates away from the cutter holder 25 in an optical axis of the optical fiber 1. By doing this, relatively weak tension is applied to the optical fiber 1 in an optical axis. Furthermore, the convex rail 31b which is disposed on the uncoated section clamp base 31 is pulled to the convex rail 25b which is disposed on the cutter holder 25 by repulsing-force which exists between the magnet 33 and the second magnet 36 when the cutter 24 is moved in an orthogonal direction to an optical axis of the optical fiber 1. By doing this, relatively strong force is applied to the uncoated section holder 22 in a direction which separates away from the cutter holder 25 in an optical axis direction of the optical fiber 1. By doing this, relatively strong tension is applied to the optical fiber 1 in an optical axis direction. Consequently, a crack which is formed on a surface of the uncoated section 1a is enlarged; thus, the uncoated section 1a is cut.

Figure 10A:
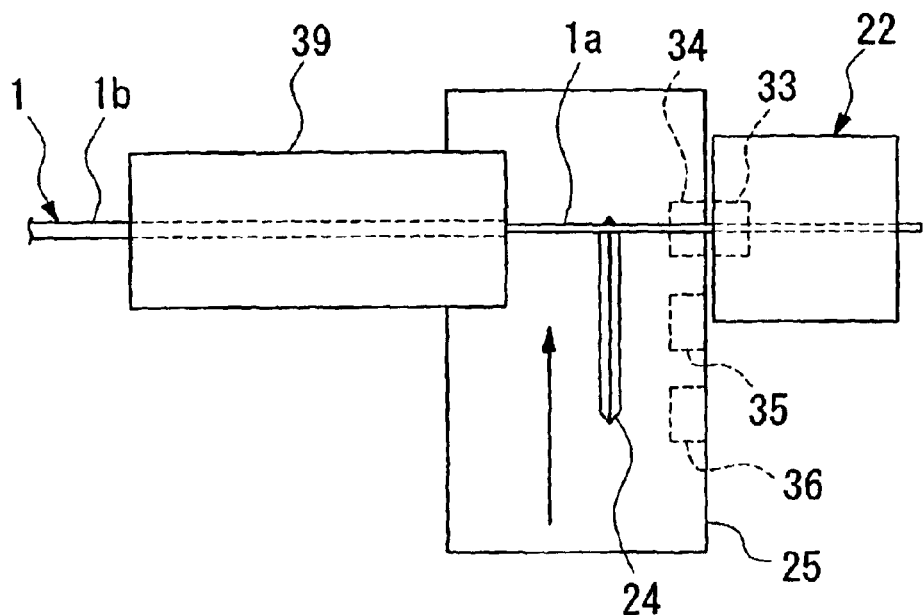
FIGS. 10A and 10B show a fifth embodiment of the optical fiber cutting apparatus according to the present invention.
Figure 10B:
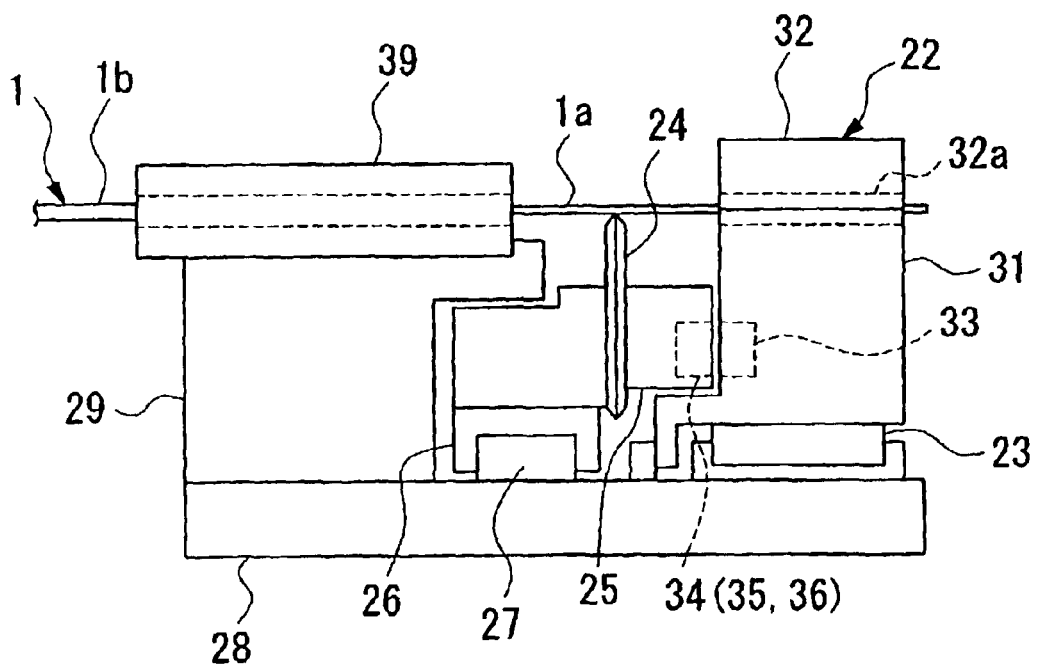

FIGS. 10A and 10B show a fifth embodiment of the optical fiber cutting apparatus according to the present invention. FIG. 10A is a plan view. FIG. 10B is a front view. In FIGS. 10A and 10B, the same reference numerals are applied to corresponding members as shown in the first embodiment shown in FIGS. 1A and 1B so as to omit the repeated explanation thereof.

In an optical fiber cutting apparatus according to the present embodiment, an optical fiber holder 39 is fixed on a top surface of the coated section clamp base 29. The optical fiber holder 39 is disposed in parallel with the longitudinal direction of the optical fiber cutting apparatus. The optical fiber holder 39 contains a base having a groove for holding the optical fiber 1 and a cap which is connected to the base so as to open and close freely.

Also, the magnet 33 is disposed so as to have the same polarity as the first magnet 35 and the second magnet 36. The magnet 33 is disposed so as face the first magnet 35 and the second magnet 36. An embodiment of the optical fiber cutting apparatus is explained with reference to FIGS. 10A and 10B as follows.

First, the cutter 24 is moved in an opposite direction to an arrow shown in the drawing. The magnet 33 and the ferromagnetic substance 34 are disposed so as to face each other. At this time, the uncoated section holder 22 is pulled to the cutter holder 25 in an optical axis direction of the optical fiber 1.

Next, the coated section 1b of the optical fiber 1 is held by the optical fiber holder 39.

Next, the optical fiber holder 39 is fixed on top surface of the coated section clamp base 29.

Next, while maintaining the above-described condition, the uncoated section 1a is fixed to the uncoated section holder 22.

Next, the cutter 24 is moved in a direction of an arrow (in an orthogonal direction to an optical axis of the optical fiber 1) shown in the drawing. Relatively weak force is applied to the uncoated section holder 22 in a direction which separates away from the cutter holder 25 in an optical axis of the optical fiber 1 by repulsing force which exists between the magnet 33 and the first magnet 35 at the same time as the cutter 24 contacts the uncoated section 1a from beneath. By doing this, relatively weak tension is applied to the optical fiber 1 in an optical axis direction. Furthermore, relatively strong force is applied to the uncoated section holder 22 in a direction which separates away from the cutter holder 25 in an optical axis direction of the optical fiber 1 by the repulsing force which exists between the magnet 33 and the second magnet 36 when the cutter 24 is moved in an orthogonal direction to an optical axis of the optical fiber 1. By doing this, relatively strong tension is applied to the optical fiber 1 in an optical axis direction. Therefore, a crack which is formed on a surface of the uncoated section 1a is enlarged; thus, the uncoated section 1a is cut.

Figure 11A:
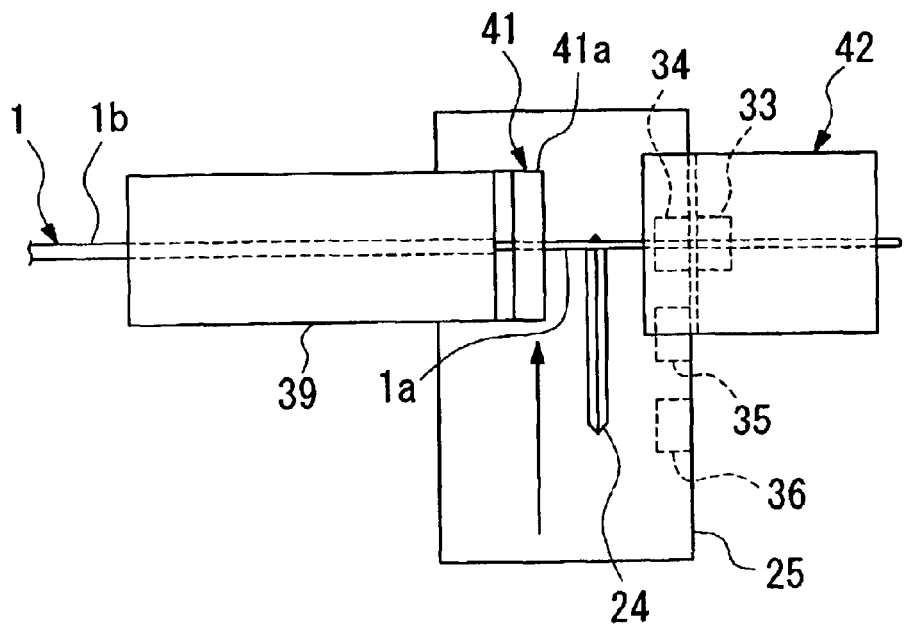
FIGS. 11A and 11B show a sixth embodiment of the optical fiber cutting apparatus according to the present invention.
Figure 11B:
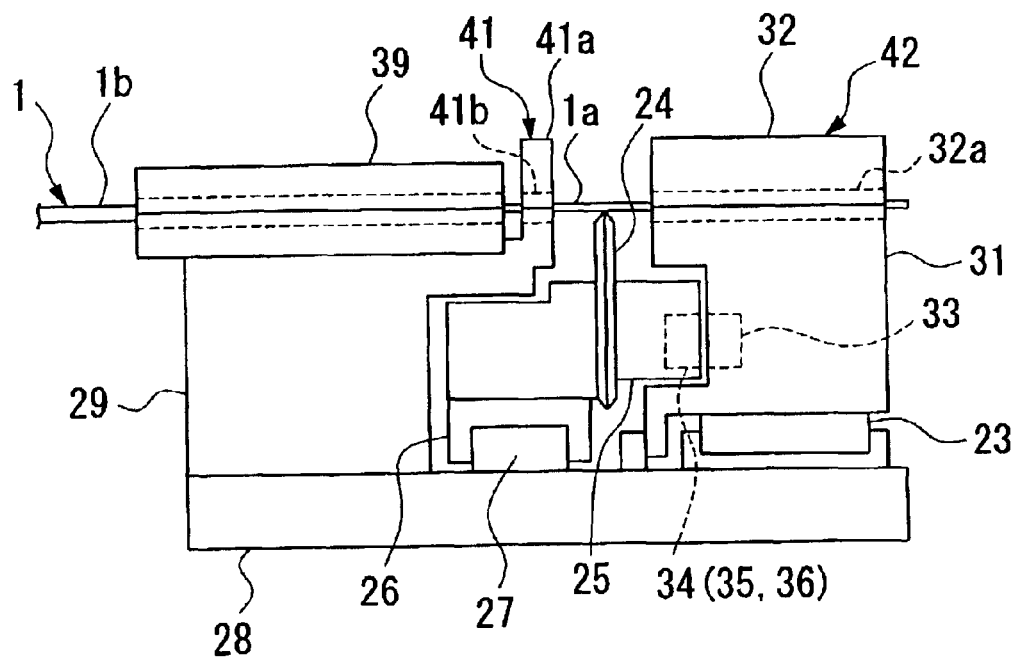

FIGS. 11A and 11B show a sixth embodiment of the optical fiber cutting apparatus according to the present invention. FIG. 11A is a plan view. FIG. 11B is a front view. In FIGS. 11A and 11B, the same reference numerals are applied to corresponding members as shown in the first embodiment shown in FIGS. 1A and 1B so as to omit the repeated explanation thereof.

In an optical fiber cutting apparatus according to the present embodiment, the optical fiber holder 39 is fixed on a top surface of the coated section clamp base 29. A first uncoated section holder 41 is disposed next to the optical fiber holder 39. Also, a second uncoated section holder 42 having the similar structure as that of the first uncoated section holder 41 shown in FIGS. 1A and 1B is disposed having a predetermined interval with the first uncoated section holder 41.

On the first uncoated section holder 41, an uncoated section clamp 41a is disposed which is connected to the coated section clamp base 29 by a hinge so as to freely open and close. Also, on the first uncoated section holder 41, a flexible substance (not shown in the drawing) such as a rubber for fixing the uncoated section 1a of the optical fiber 1 is formed in parallel with longitudinal direction of the optical fiber cutting apparatus. Also, on the uncoated section clamp 41a, a contacting member 41b made from a flexible substance such as a rubber for pushing the uncoated section 1a of the optical fiber 1 so as to fix the uncoated section 1a of the optical fiber 1 into a groove which is formed on a top surface of the uncoated section clamp base 29 is disposed in parallel with longitudinal direction of the optical fiber cutting apparatus.

Also, the magnet 33 is disposed so as to have the same polarity as the first magnet 35 and the second magnet 36. The magnet 33 is disposed so as face the first magnet 35 and the second magnet 36. An embodiment of the optical fiber cutting apparatus is explained with reference to FIGS. 11A and 11B as follows.

First, the cutter 24 is moved in an opposite direction to an arrow shown in the drawing. The magnet 33 and the ferromagnetic substance 34 are disposed so as to face each other. At this time, the second uncoated section holder 42 is pulled to the cutter holder 25 in an optical axis direction of the optical fiber 1.

Next, the coated section 1b of the optical fiber 1 is held by the optical fiber holder 39.

Next, the optical fiber holder 39 is fixed on a top surface of the coated section clamp base 29.

Consequently, while maintaining the above-described condition, the uncoated section 1a is fixed to the first uncoated section holder 41 and the second uncoated section holder 42. Next, the cutter 24 is moved in a direction of an arrow (in an orthogonal direction to an optical axis of the optical fiber 1) shown in the drawing. Relatively weak force is applied to the uncoated section holder 22 in a direction which separates away from the cutter holder 25 in an optical axis of the optical fiber 1 by repulsing force which exists between the magnet 33 and the first magnet 35 at the same time as the cutter 24 contacts the uncoated section 1a from beneath. By doing this, relatively weak tension is applied to the optical fiber 1 in an optical axis direction. Furthermore, relatively strong force is applied to the second uncoated section holder 42 in a direction which separates away from the cutter holder 25 in an optical axis direction of the optical fiber 1 by the repulsing force which exists between the magnet 33 and the second magnet 36 when the cutter 24 is moved in an orthogonal direction to an optical axis of the optical fiber 1. By doing this, relatively strong tension is applied to the optical fiber 1 in an optical axis direction. Therefore, a crack which is formed on a surface of the uncoated section 1a is enlarged; thus, the uncoated section 1a is cut.

Here, in the present embodiment, on a surface of the cutter holder 25 and a surface of the second uncoated section holder 42, the magnets are disposed so as to face each other. In the optical fiber cutting apparatus according to the present invention, it is acceptable that magnets are disposed on a surface of the cutter holder and on a surface of the first uncoated section holder 41 which are facing each other.

Figure 12A:
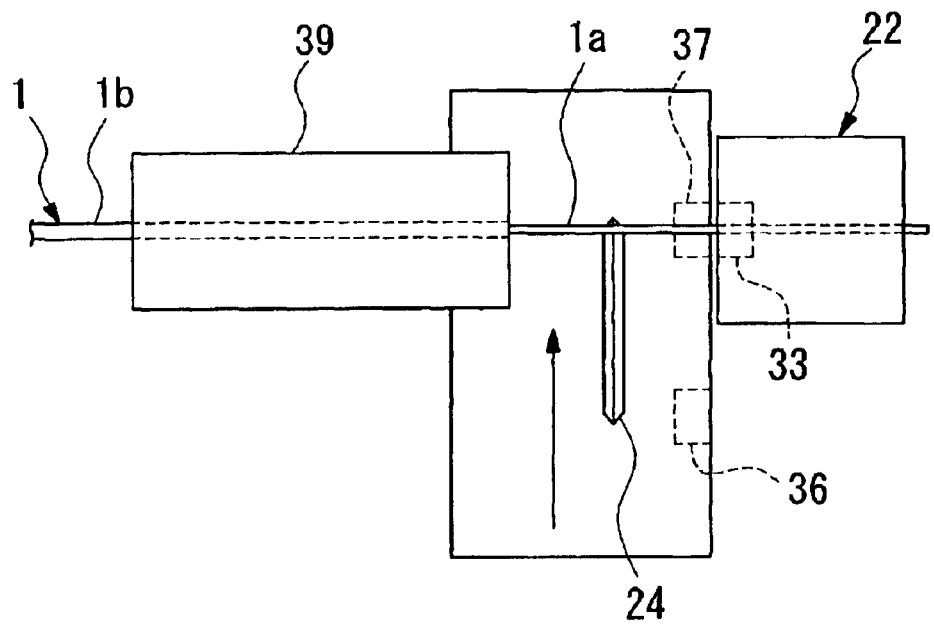
FIGS. 12A and 12B show a seventh embodiment of the optical fiber cutting apparatus according to the present invention.
Figure 12B:
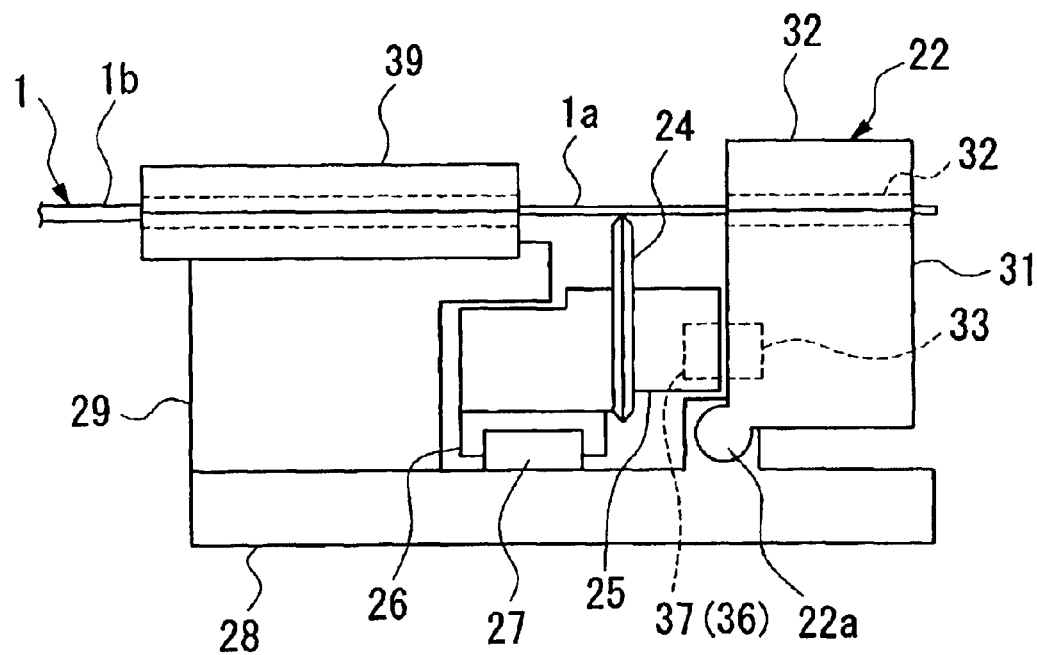

FIGS. 12A and 12B show a seventh embodiment of the optical fiber cutting apparatus according to the present invention. FIG. 12A is a plan view. FIG. 12B is a front view. In FIGS. 12A and 12B, the same reference numerals are applied to corresponding members as shown in the first embodiment shown in FIGS. 1A and 1B so as to omit the repeated explanation thereof.

In an optical fiber cutting apparatus according to the present embodiment, the uncoated section holder 22 is fixed by a hinge 22a to a base 28 for fixing the uncoated section holder 29 so as to rotate freely. On a surface of the cutter holder 25 facing the uncoated section holder 22, the second magnet 36 and the third magnet 37 are disposed having a predetermined interval. The magnet 33 is disposed on a surface of the uncoated section holder 22 facing the cutter holder 25.

Figure 13:
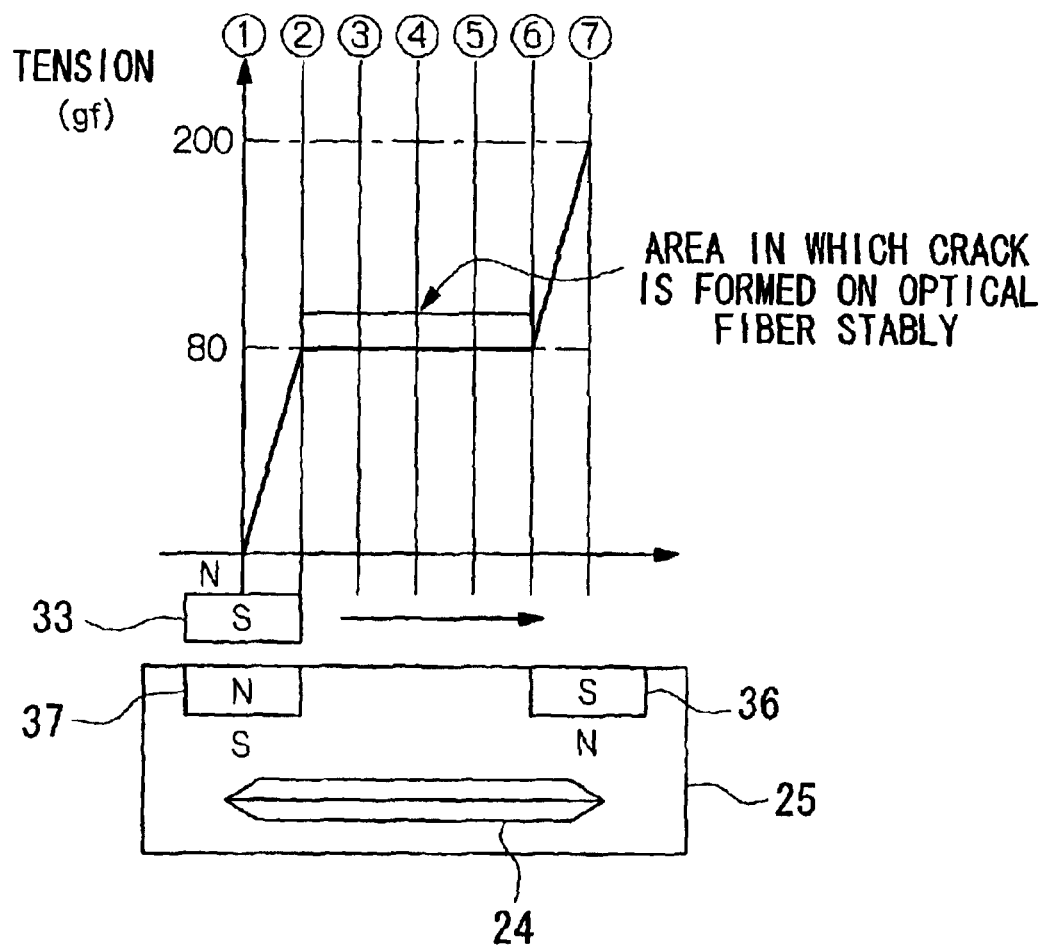
FIG. 13 shows how tension which is applied to the optical fiber changes when the cutter is moved in a direction orthogonal to an optical axis of the optical fiber.
Figure 14:
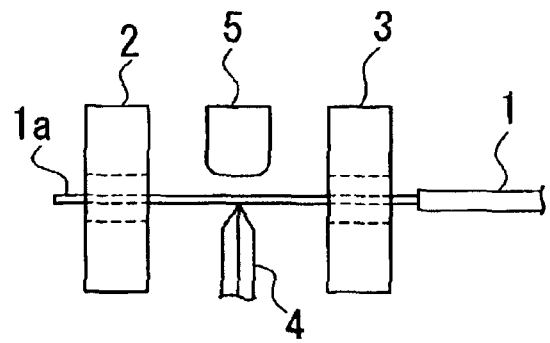
FIG. 14 is a front view of a first example of a conventional optical fiber cutting apparatus.
Figure 15:
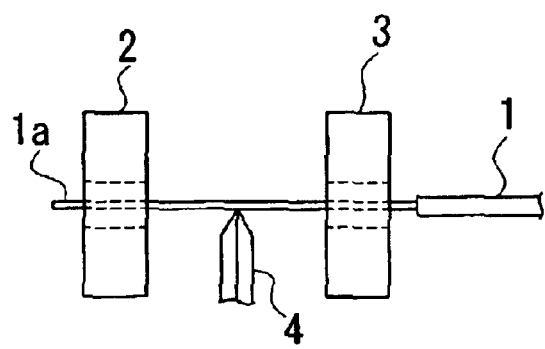
FIG. 15 is a front view of a second example of a conventional optical fiber cutting apparatus.
Figure 16:
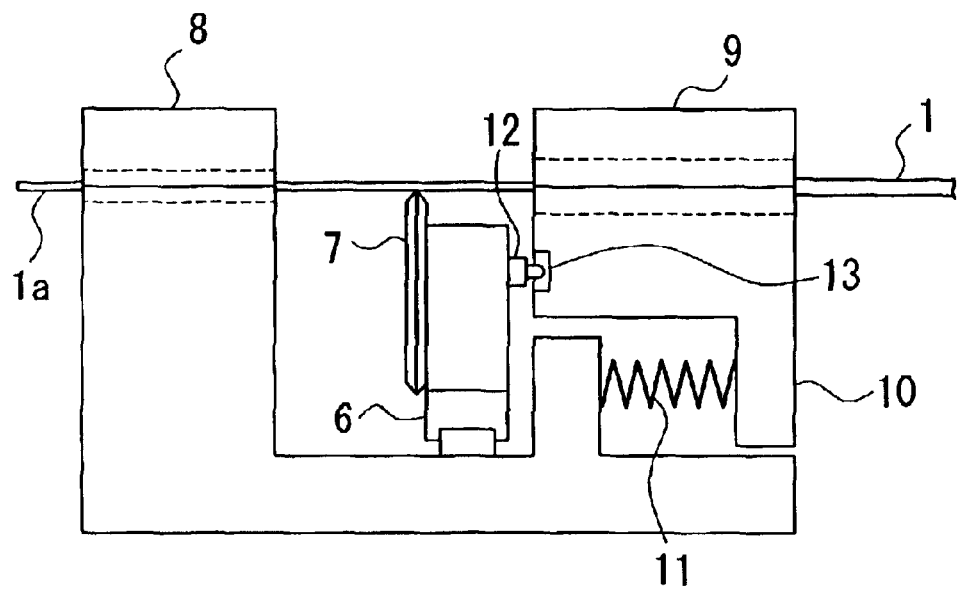
FIG. 16 is a front view of a third example of a conventional optical fiber cutting apparatus.

Also, the magnet 33 is disposed on a surface of the uncoated section holder 22 facing a surface of the base 28. The polarity of the magnet 33 is different from that of the second magnet 36. The polarity of the magnet 33 is the same as that of the third magnet 37. FIG. 13 shows how tension which is applied to the optical fiber changes when the cutter is moved in an orthogonal direction to an optical axis of the optical fiber.

Here, with reference to FIG. 13, explanation is given for how tension which is applied to the optical fiber changes when the optical fiber is cut by using the optical fiber cutting apparatus according to the present embodiment as follows.

In ①, the cutter holder 25 is in an initial position. Pulling-force exists between the N-pole of the third magnet 37 which is disposed on the cutter holder 25 and the S-pole of the magnet 33 which is disposed on the uncoated section holder 22. Moment which is generated by pulling-force existing around a center of the uncoated section clamp 32 of the uncoated section holder 22 is larger than moment which is generated by self-weight of the uncoated section holder 22. Therefore, tension which is applied to the optical fiber 1 is 0 gf.

During ① to ②, pulling-force which exists between the third magnet 37 and the magnet 33 decreases; thus, tension which is applied to the optical fiber 1 becomes dominant by self-weight of the uncoated section holder 22.

During ② to ⑥, tension is applied to the optical fiber 1 only by self-weight of the uncoated section holder 22.

During ⑥ to ⑦, repulsing force which exists between the second magnet 36 and the magnet 33 begins increasing. Tension containing self-weight of the uncoated section holder 22 is applied to the optical fiber 1.

At ⑦, 200 gf of tension is applied to the optical fiber 1; thus, the optical fiber 1 is cut.

In the optical fiber cutting apparatus according to the present embodiment, 80 gf of tension due to self-weight of the uncoated section holder 22 is applied to the optical fiber 1 for a longer period than in a case which is described in the first embodiment. Therefore, it is easy to synchronize a timing for forming a crack on the optical fiber 1 to a timing for applying 80 gf of tension to the optical fiber 1. Thus, it is possible to form a crack on the optical fiber 1 more stably.

As explained above, by the optical fiber cutting apparatus according to the present invention, it is possible to apply tension in an optical axis direction of the optical fiber. Therefore, it is possible to cut the optical fiber without applying bending-force to a crack which is formed on a surface of the optical fiber. Thus, a flaw does not occur on a surface of the optical fiber. Also, surface finish of a cutting-surface of the optical fiber becomes a mirror surface which is orthogonal to an optical axis.

Also, when a crack is formed on the optical fiber while applying tension to the optical fiber, vibrations caused by a tension-applying device in the optical fiber cutting apparatus are not transmitted to the cutter. Therefore, a crack is formed on the optical fiber stably; thus the surface finish is desirable.

Also, the coated section holder or the uncoated section holder is pulled to the cutter holder by magnetic force. Therefore, an operator of the optical fiber cutting apparatus does not have to move the coated section holder or the uncoated section holder close to the cutter holder when fixing the optical fiber.

What is claimed is:

1. An optical fiber cutting apparatus comprising:
   a coated section holder for holding a coated section of an optical fiber terminal;
   an uncoated section holder for holding an uncoated section of an optical fiber; and
   a cutter for cutting the uncoated section between the coated section holder and the uncoated section holder, wherein
   a ferromagnetic substance or a magnet is disposed on facing surfaces of the uncoated section holder and a cutter holder for holding the cutter.

2. An optical fiber cutting apparatus according to claim 1 wherein a ferromagnetic substance or a plurality of magnet having different magnetic force are disposed on the uncoated section holder or the cutter holder.

3. An optical fiber cutting apparatus according to claims 1, wherein the optical fiber is cut by forming a crack in the uncoated section of the optical fiber by the cutter and by applying tension to the optical fiber by repulsing force between a magnet which is disposed on the coated section holder and a magnet which is disposed on the cutter holder.

4. An optical fiber cutting apparatus according to claim 3 wherein tension which is caused by repulsing force between a magnet which is disposed on the coated section holder and a magnet which is disposed on the cutter holder is applied to an optical fiber while the tension gradually increases.

5. An optical fiber cutting apparatus according to claim 1, wherein the optical fiber is cut by forming a crack in the uncoated section of the optical fiber by the cutter and by applying tension to the optical fiber by repulsing force between a magnet which is disposed on the uncoated section holder and a magnet which is disposed on the cutter holder.

6. An optical fiber cutting apparatus according to claim 5 wherein the tension which is caused by the repulsing force between the magnet which is disposed on the uncoated section holder and the magnet which is disposed on the cutter holder is applied to the optical fiber while the tension gradually increases.

7. An optical fiber cutting apparatus according to claim 1, wherein the optical fiber is cut by forming a crack in the uncoated section of the optical fiber by the cutter and by applying tension to the optical fiber by pulling-force between a magnet which is disposed on the coated section holder and a magnet which is disposed on the cutter holder.

8. An optical fiber cutting apparatus according to claim 7 wherein tension which is caused by pulling-force between the magnet which is disposed on the coated section holder and the magnet which is disposed on the cutter holder is applied to an optical fiber while the tension gradually increases.

9. An optical fiber cutting apparatus according to claim 1, wherein the optical fiber is cut by forming a crack in the uncoated section of the optical fiber by the cutter and by applying tension to the optical fiber by pulling-force between a magnet which is disposed on the uncoated section holder and a magnet which is disposed on the cutter holder.

10. An optical fiber cutting apparatus according to claim 9 wherein tension which is caused by pulling-force between the magnet which is disposed on the uncoated section holder and the magnet which is disposed on the cutter holder is applied to an optical fiber while the tension gradually increases.

11. An optical fiber cutting apparatus comprising:
    a coated section holder for holding a coated section of an optical fiber terminal;
    an uncoated section holder for holding an uncoated section of an optical fiber; and
    a cutter for cutting the uncoated section between the coated section holder and the uncoated section holder, wherein
    a ferromagnetic substance or a magnet is disposed on facing surfaces of the coated section holder and a cutter holder for holding the cutter.

12. An optical fiber cutting apparatus according to claim 11 wherein a ferromagnetic substance or a plurality of magnet having different magnetic force are disposed on the coated section holder or the cutter holder.

13. An optical fiber cutting apparatus comprising:
    a coated section holder for holding a coated section of an optical fiber terminal;
    an uncoated section holder having a first uncoated section holder which is disposed next to the coated section holder and a second uncoated section holder which is disposed away from the first uncoated section holder; and
    a cutter for cutting the uncoated section between the first uncoated section holder and the second uncoated section holder, wherein
    a ferromagnetic substance or a magnet is disposed on facing surfaces of the uncoated section holder and a cutter holder for holding the cutter.

14. An optical fiber cutting apparatus according to claim 13 wherein a ferromagnetic substance or a plurality of magnet having different magnetic force are disposed on the uncoated section holder or the cutter holder.

15. An optical fiber cutting apparatus comprising:
    a coated section holder for holding a coated section of an optical fiber terminal;
    an uncoated section holder having a first uncoated section holder which is disposed next to the coated section holder and a second uncoated section holder which is disposed away from the first uncoated section holder; and
    a cutter for cutting the uncoated section between the first uncoated section holder and the second uncoated section holder, wherein
    a ferromagnetic substance or a magnet is disposed on facing surfaces of the coated section holder and a cutter holder for holding the cutter.

16. An optical fiber cutting apparatus according to claim 15 wherein a ferromagnetic substance or a plurality of magnet having different magnetic force are disposed on the coated section holder or the cutter holder.

17. An optical fiber cutting apparatus comprising:
    a coated section holder for holding a coated section of an optical fiber terminal;
    an uncoated section holder for holding an uncoated section of an optical fiber; and
    a cutter for cutting the uncoated section between the coated section holder and the uncoated section holder, wherein the uncoated section holder is rotatably fixed on a base for fixing the coated section holder;

two ferromagnetic substances having different polarities or two magnets having different polarities are disposed in a predetermined interval on the cutter holder for fixing the cutter which faces the uncoated section holder; and a ferromagnetic substance or a magnet is disposed on a surface of the uncoated section holder which faces the cutter holder.

18. An optical fiber cutting apparatus according to claim 17 wherein the optical fiber is cut by forming a crack in an uncoated section of the optical fiber by moving the cutter and by applying tension which is caused by self-weight of the uncoated section holder at a position between the uncoated section holder and the cutter holder on the optical fiber.

* * * * *